Patented May 28, 1940

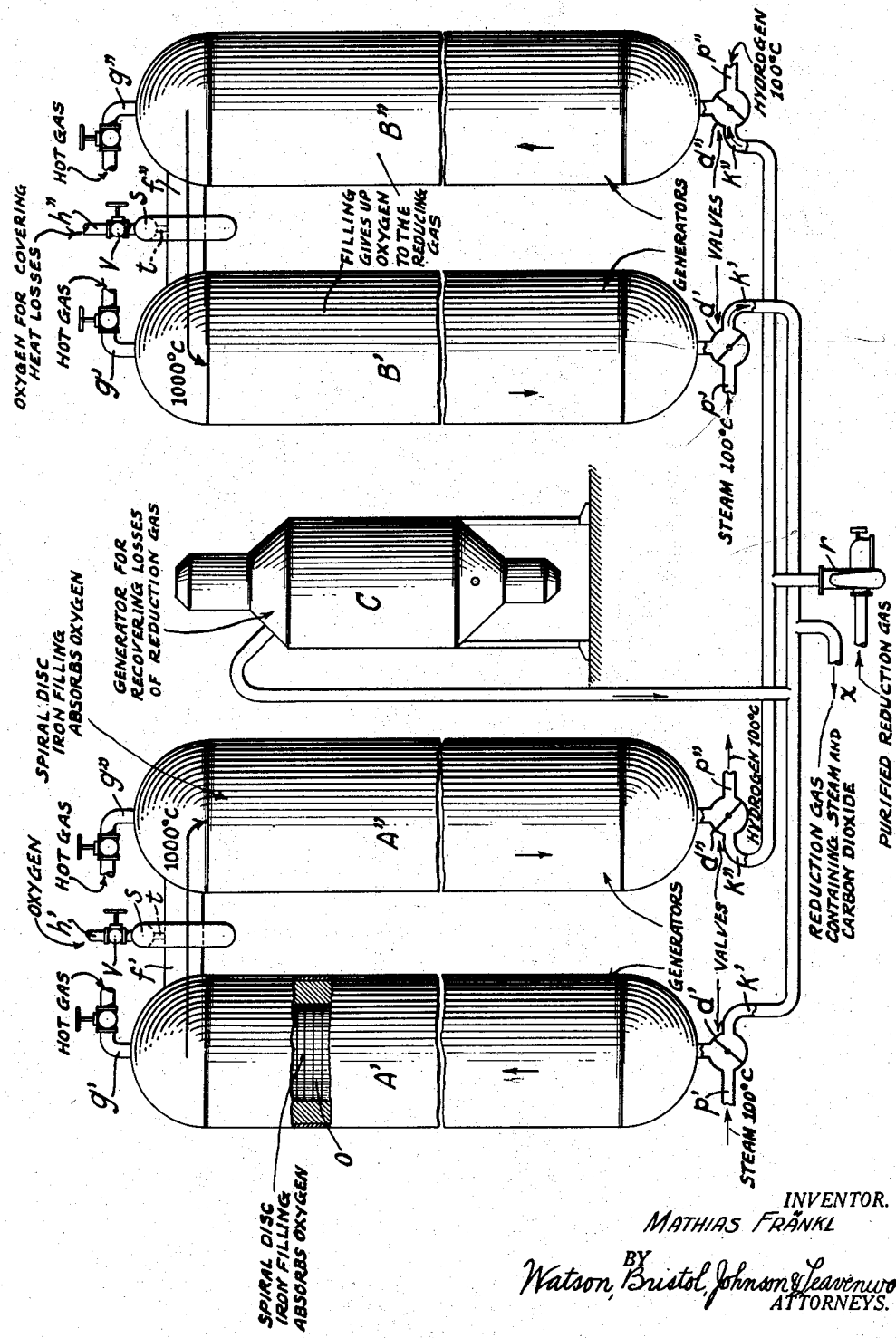

2,202,374

UNITED STATES PATENT OFFICE 2,202,374

PROCESS OF PRODUCING HYDROGEN

Mathias Frankl, Augsburg, Germany, assignor to American Oxythermic Corporation, New York, N. Y., a corporation of Delaware Application September 25, 1936, Serial No. 102,480
In Germany October 3, 1935

8 Claims. (Cl. 23—214)

The invention relates to a process and an apparatus for the production of hydrogen. More particularly, it relates to the production of hydrogen from steam through interaction with a material capable of forming an oxide, and includes correlated improvements and discoveries whereby hydrogen in a substantially pure condition may be obtained.

It is generally known in the art that by contacting steam with incandescent iron pure hydrogen can be produced. The oxygen content of the steam oxidizes the iron to iron oxide, which, in turn, is reduced again to iron by a subsequent treatment with a reducing gas.

To carry out this process an apparatus has been used which comprises a shaft filled with small lumps of iron, or iron ore, and a heat regenerator, in which the reducing gas gives up its heat from about 1000° C. downward to the regenerator filling, which consists of refractory checkerwork. The heat thus stored is re-absorbed by the steam for reaction with the iron, and which is introduced in the opposite direction. This steam is heated to about 900° C. before flowing into an iron filled shaft, wherein it is decomposed.

However, this process is attended by the disadvantage that the amount of reducing gas for reduction of the iron oxide can be utilized only to about one-third of the amount introduced because of the reaction equilibrium, and also that a special heat regenerator is necessary for heat exchange between the reducing gas leaving the regenerator at about 1000° C. and the steam to be heated to about 900° C. In this special heat regenerator no decomposition of steam takes place.

These disadvantages are largely overcome by the present invention which provides a regenerative process for producing pure hydrogen from steam by combining the oxygen of the water with iron, or other suitable metal or solid material capable of being oxidized by steam and of being reduced by a reducing gas at not too high a temperature, said materials being subsequently freed from the oxygen by subjection to a current of a reducing gas.

It is an object of the invention to provide a process whereby a hydrogen of high purity may be produced.

Another object of the invention is the provision of a process in which hydrogen is produced by reaction of steam and iron at a high temperature, and in which the iron acts as a regenerative body taking up heat from a hot gas and giving up heat to a cool gas in sequence.

A further object of the invention is to provide a procedure for the production of pure hydrogen which may be carried out readily and effectively on a commercial scale and more economically than previously.

An additional object of the invention is to provide a process in which hydrogen may be produced under super-atmospheric pressures, so that the produced hydrogen may be utilized directly in synthetic operations requiring hydrogen under pressure, for example, ammonia synthesis.

A more specific object of the invention is the provision of a process in which the full reducing effect of a gas utilized to reduce the oxide to the original material, as iron oxide to iron, is made available by a recirculation of the unused portion of reducing gas.

A still further object of the invention is the provision of an apparatus in which the production of hydrogen in a high degree of purity may be efficiently practiced, such apparatus containing a regenerative and reactive filling material, and in which the flow of steam and of reducing gas may be alternately and periodically reversed.

Other objects of the invention will in part be obvious and will in part appear hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

In the practice of the invention hydrogen of high purity may be produced by reacting steam under reactive conditions with a material that is capable of decomposing the steam with the formation of an oxide. The material employed possesses regenerative properties so that the heat remaining in the gaseous mixture following reaction with the formation of hydrogen may be recovered and stored and then given up to the steam being introduced at a succeeding phase of the operation. Thereby heat losses are obviated and the steam preheated substantially to the reaction temperature.

When the regenerative material has become converted into the oxide to such an extent that the reaction is materially retarded or lessened, a reducing gas is passed through the reaction chambers whereby the oxide is converted into the original filling material. Following reduction of the oxide, steam is again introduced and the process carried through with alternate and periodical passage of steam and a reducing gas. The hydrogen produced is substantially pure and may be utilized as such for the production of ammonia, or in hydrogenation reactions, or it may be utilized by contacting it with highly heated carbon whereby the carbon and hydrogen react with the formation of methane. The gas so prepared will be free from carbon monoxide.

For a fuller understanding of the nature and objects of the invention reference should be had to the following detailed description taken in connection with the accompanying drawing, in which there is shown, schematically, an apparatus which is suitable for carrying out my process of producing hydrogen by decomposition of steam.

The apparatus comprises two pairs of regenerative steam decomposers, or hydrogen generators, A', A'' and B', B'', which are filled with corrugated metal strips disposed in spirals forming discs $o$; two reversing valves $d'$, $d''$ for each pair of decomposers or regenerators; upper connections $f'$, $f''$ and two conduits $g'$, $g''$ for the supply of hot gas for hot blowing when starting the operation. The discs more particularly may be made by taking a flat strip of iron, passing it through rolls which effect corrugation, then winding the thus corrugated strip about a mandrel, axle or spool in the form of a spiral, and continuing the spiral winding until a circular disc of desired diameter is formed. For introducing oxygen during the process to cover heat losses by combustion of a small portion of the reducing gas there are provided annular conduits $s$ with nozzles $t$ and regulating valves $v$.

When starting the operation of the plant the steam decomposers A' and B' are first heated by blowing in a reducing gas heated to 1000° C. at $g'$, in such a manner that only the metal disc insets of the upper half are heated to this temperature, whereas in the lower half the temperature drops to about 100° C. at the outlet end.

The steam decomposers A'' and B'' on the other hand are heated by a hot gas introduced at $g''$ in such a manner that the temperature in the upper quarter only reaches 1000° C., and thence to the middle it falls to about 100° C.

After heating in the above manner the decomposition of steam may be started. This is done by first introducing steam at $p'$ into decomposer A' via reversing valve $d'$ at about 0.2–25 atmospheres gage. The steam while passing through the lower half of decomposer A' is heated to about 900° C., and in the upper half it is decomposed through reaction with the iron filling which is oxidized to iron oxide. The hydrogen produced in this reaction flows through the upper conduit $f'$ into decomposer A'', in the lower half of which it gives up its sensible heat to the filling and leaves this decomposer via reversing valve $d''$ at $p''$ at about 100° C. in the direction as shown by arrow. This procedure is continued until the iron filling in decomposer A' and in the upper half of A'' is by reaction with steam oxidized to such an extent that signs of exhaustion can be observed.

The supply of steam is now stopped by setting the reversing valves $d'$ and $d''$ in the positions shown at the second pair of decomposers B' and B''. Instead of steam, a reducing gas is now introduced at $k''$ which is led through decomposer A'' to decomposer A', until the oxidized fillings of these decomposers are reduced. The reducing gas while passing through the lower part of decomposer A'' is heated to 900° C., and while passing through the lower part of decomposer A' it is cooled again to about 100° C. It finally leaves the apparatus at $k'$ with about a 33% $H_2O+CO_2$ content.

During reduction of the iron oxide in decomposers A' and A'', the decomposition of steam takes place in decomposers B' and B'', so that the production of hydrogen is not interrupted. When the reduction of the iron oxide in decomposer pair A', A'' is finished, the production of hydrogen again takes place in these decomposers A' and A'', whereas in decomposers B' and B'' the reduction of the iron oxide formed therein is effected by leading reduction gas through them.

The portion of steam contained in the 33% $H_2O+CO_2$ present in the used gas from the reduction phase is removed by condensation, and the content of carbon dioxide is removed by absorption or by freezing. The thus purified gas may again be introduced into the steam decomposers by means of the fan $r$. The deficit in reducing gas due to removal of steam and carbon dioxide is covered by supplying additional reducing gas generated in gas generator C.

The reducing gas is discharged to a carbon dioxide and steam separating apparatus, not shown in the drawing, through the pipe $x$. This pipe $x$ serves also to conduct the additional gas from the gas generator, which must likewise be freed of carbon dioxide and surplus of steam before it can be used as reducing gas. At the same time this gas is freed from dust and tar.

Heat which is lost in the regenerators during steam decomposition and reduction of iron oxide through imperfect heat exchange and heat radiation does not exceed 10% of the total heat quantity. This loss can be compensated by a partial combustion of the reducing gas with oxygen, which is introduced at $h'$ and $h''$ while the reduction is taking place, or some reducing gas may be introduced at $g'$ and $g''$, which has previously been heated to 1000° C. outside the apparatus.

The heat balance between the oxidation process and the steam decomposition on the one hand, and between the reduction process and the combustion heat of the reduction process on the other hand follows an even course inasmuch as the decomposition of 0.75 kg. i. e. 1 cbm. steam into 1 cbm. $H_2$ and 0.5 cbm. $O_2$ yields a heat surplus of 300 kcal., whereas during the reduction period a small deficit of 150–300 kcal. occurs (according to the amount of hydrogen and methane contained in the reducing gas).

This process is particularly advantageous when the hydrogen is to be used in highly compressed state, such as for ammonia synthesis and all hydrogenation processes, if the decomposition of the steam and reduction of the iron oxide is carried out at a pressure of about 5–25 atm., inasmuch as the entire compression work can thereby be obviated. For this purpose the steam to be decomposed is lead under increased pressure through the steam decomposers, and the produced hydrogen is withdrawn at such pressure. To reduce the iron oxide the reducing gas is lead at a similar pressure through the steam decomposers, and the additional reducing gas which is necessary to replace the removed $CO_2+H_2O$ is produced at a like pressure in a pressure generator.

However, the production of hydrogen at a superatmospheric pressure does by no means require that the reduction process also and the production of the additional gas take place under pressure, but these two processes may, if desired, take place at atmospheric pressure. After the iron insets in the steam decomposers are oxidized through the steam decomposition, the content of hydrogen must in this case be reduced in pressure from 5–25 atm. to atmospheric pressure in order subsequently to pass reducing gas at atmospheric pressure through the decomposers. The carrying out of the reduction process and of the process of producing additional reducing gas under pressure is of advantage because the carbon dioxide can then be removed through hydraulic absorption almost without any expense.

When the iron oxide in the regenerators has been reduced, the hydrogen gas produced in the first few seconds, e. g. 5 to 10, after reversing is discharged separately and used as reducing gas, because it has been contaminated somewhat with the reducing gas remaining in the regenerators from the previous filling.

To produce one cbm. hydrogen at 25 atmospheres (with or without pressure regeneration by a reducing gas) and to produce oxygen from air, a total amount of energy of only 0.15 HPh. per cbm. hydrogen produced is necessary. According to the customary processes of producing hydrogen from generator gas free from nitrogen, or from water gas by converting carbon monoxide into carbon dioxide there must be utilized about 0.33 HPh. for compressing the mixture of hydrogen and carbon dioxide to eliminate the $CO_2$ content by hydraulic sprinkling plus 0.15 HPh. for the production of oxygen, which serves for operating the gas circulating fan and for increasing the pressure of the water for washing the carbon dioxide to about 25 atmospheres, that is, a total amount of energy of 0.48 HPh. per cbm. of hydrogen produced. This requires also a double arrangement of apparatus with respective effects, namely, for producing the energy for compressing the gas, and for increasing the pressure of the large quantities of water for the $CO_2$ washing to 25 atmospheres, inasmuch as the proportion of $CO_2$ in the gas mixture according to the customary processes amounts to about 70%, whereas according to my process no carbon dioxide at all is contained in the hydrogen itself.

It may be added that with the customary manner of working according to prior methods, up to 8% hydrogen is lost through absorption during the hydraulic carbon dioxide washing, whereas the hydrogen produced according to the process of the present invention does not require a carbon dioxide washing.

Furthermore, when working according to the previous processes, there is a requirement of steam for the generation of gas and also for the carbon monoxide into carbon dioxide conversion process, if the amount of CO remaining after the conversion of the generator or water gas to hydrogen and carbon dioxide shall be smaller than 3–5%, whereas according to the new process the total consumption of steam amounts only to 1 kg. per cbm. hydrogen produced, of which one half can be produced with the waste gas heat from the generation of additional gas.

In a development of the process the hydrogen produced under pressure is passed through a shaft filled with incandescent coal in order to generate a heating or service gas. According to present regulations a service gas must have an upper heating value of 4200 kcal., whereas hydrogen has only a heating value of 2800 kcal. But if the hydrogen is passed under pressure through an incandescent layer of coke at about 600°–700° C., a portion of the hydrogen combines with the carbon to form methane, which has a heating value of about 7800 kcal. per cbm. One-third cbm. $CH_4$+two-thirds $H_2$ result consequently in a gas with the required heating value of 4200 kcal., and which is free from poisonous carbon monoxide.

The reaction of hydrogen with carbon to produce methane releases about 1300 kcal. of heat per kg. methane, that is, per cbm. methane about 850 kcal., and at a proportion of one-third cbm. methane in the service gas such released heat amounts to 280 kcal. This amount is just sufficient to cover the heat loss in the hydrogenation shaft, when the hydrogen is introduced into the latter at a temperature of about 250° C., as is the case here, because the hydrogen leaves the steam decomposers at a somewhat higher temperature than that at which the steam to be decomposed and having a tension of about 25 atmospheres enters into the decomposers.

The invention is characterized, in part, in that (1) two-thirds of the amount of reducing gas, which amount is not consumed by the reduction, is used again by circulation for a subsequent reduction, after the water formed in the reduction step by burning a portion of hydrogen contained therein is removed by condensation, and the carbon dioxide is either reduced to CO, or removed through absorption or freezing; and (2) the decomposition of steam takes place in an iron filled twin shaft, wherein the iron filling functions as a heat regenerator for exchange of heat between escaping hot produced hydrogen and incoming steam, whereby the hydrogen is cooled to a relatively low temperature, and the steam heated substantially to reaction temperature; and (3) the decomposition of steam may be effected at a pressure of about 10–25 atmospheres, whereas the reduction of the iron oxide produced thereby may be effected either without pressure, or also at a super-atmospheric pressure.

Since certain changes in carrying out the above process and in the constructions set forth, which embody the invention may be made without departing from its scope, it is intended that all matter contained in the above description, or shown in the accompanying drawing, shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A process for the production of hydrogen, which comprises contacting steam under reactive conditions with a first body of iron with formation of iron oxide, said contact resulting in only a partial reaction between the steam and iron and yielding a gas still containing oxidizing properties due to an amount of unreacted steam, passing immediately in sequence thereof the produced gas having a steam contact and oxidizing properties through a second body of iron whereby oxidation of said iron with further production of hydrogen ensues and the gas cooled and heat stored in said iron, then discontinuing passage of the steam and conducting a reducing gas through the two bodies of oxidized iron until substantial reduction of iron oxide is effected, substantially the upper half of said first body of iron being heated to a temperature of about 1,000° C. with a gradual decrease in temperature from the middle to the lower portion to a temperature of about 100° C., and substantially the upper quarter portion of the second body of iron being at a temperature of 1,000° C. with a gradual reduction therefrom to the middle of such body to a temperature of about 100° C., and such temperature being substantially maintained thence to the lowermost part of said body.

2. A process for the production of hydrogen, which comprises contacting steam under reactive conditions with a body of iron with formation of iron oxide, said contact resulting in only a partial reaction between the steam and the iron and yielding a gas still containing oxidizing properties due to an amount of unreacted steam, passing in immediate sequence the thus produced gas having oxidizing properties through a second body of iron whereby oxidation of the iron with further production of hydrogen ensues and the gas cooled and heat stored in said iron, then discontinuing passage of the steam, and conducting a reducing gas through the two bodies of oxidized iron until substantial reduction of iron oxide is effected.

3. A process for the production of hydrogen, which comprises contacting steam under reactive conditions with a body of iron with formation of iron oxide, said contact resulting in only a partial reaction between the steam and the iron and yielding a gas still containing oxidizing properties due to an amount of unreacted steam, passing in immediate sequence the thus produced gas having oxidizing properties through a second body of iron whereby oxidation of the iron with further production of hydrogen ensues and the gas cooled and heat stored in said iron, then discontinuing passage of the steam and conducting a reducing gas first through the second body of iron and then through the first body of iron until substantial reduction of the iron oxide is effected.

4. A process which comprises contacting steam under reactive conditions with iron with formation of iron oxide, said contact resulting in only a partial reaction between the steam and the iron and yielding a gas still containing oxidizing properties due to an amount of unreacted steam, passing in immediate sequence the thus produced gas having oxidizing properties through a second body of iron whereby oxidation of the iron with further production of hydrogen ensues and the gas cooled and heat stored in said iron, and then discontinuing the passage of the steam and conducting a reducing gas through the two bodies of oxidized iron until substantial reduction of iron oxide is effected, the steam and reducing gas being heated to reaction temperature solely by the iron.

5. A process for the production of hydrogen, which comprises contacting steam under reactive conditions with a body of iron with formation of iron oxide, said contact resulting in only a partial reaction between the steam and the iron and yielding a gas still containing oxidizing properties due to an amount of unreacted steam, passing in immediate sequence the thus produced gas having oxidizing properties through a second body of iron whereby oxidation of the iron with a further production of hydrogen ensues and the gas cooled and heat stored in said iron, continuing the reaction with steam until the two bodies of iron are substantially oxidized, then discontinuing the passage of the steam and conducting a reducing gas through the two bodies of oxidized iron in direction opposite to the flow of the steam until substantial reduction of iron oxide is effected, and alternately and periodically reversing the flow of steam and reducing gas through said iron.

6. A process which comprises contacting steam with a body of iron at a temperature of about 1000° C., said contact resulting in only a partial reaction between the steam and the iron and yielding a gas still containing oxidizing properties due to an amount of unreacted steam, passing in immediate sequence the thus produced gas having oxidizing properties through a second body of iron whereby oxidation of the iron with further production of hydrogen ensues and the gas cooled and heat stored in said iron, continuing the contact with steam until the iron is substantially oxidized, then discontinuing passage of the steam and conducting a reducing gas first through the second body of oxidized iron and then through the first body of oxidized iron until substantial reduction of iron oxide is effected, and alternately and periodically reversing the flow of steam and reducing gas through said bodies.

7. A process for the production of hydrogen, which comprises contacting steam at 5 to 25 atmospheres under reactive conditions with a body of iron with formation of iron oxide, said contact resulting in only a partial reaction between the steam and the iron and yielding a gas still containing oxidizing properties due to an amount of unreacted steam, passing in immediate sequence the thus produced gas having oxidizing properties through a second body of iron whereby oxidation of the iron with further production of hydrogen ensues and the gas cooled and heat stored in said iron, then discontinuing passage of the steam, conducting a reducing gas at 5 to 25 atmospheres through the two bodies of oxidized iron until substantial reduction of iron oxide is effected, and alternately and periodically reversing the flow of steam and reducing gas through said iron.

8. A process for the production of hydrogen, which comprises contacting steam under reactive conditions with a body of iron with formation of iron oxide, said contact resulting in only a partial reaction between the steam and the iron and yielding a gas still containing oxidizing properties due to an amount of unreacted steam, passing in immediate sequence the thus produced gas having oxidizing properties through a second body of iron whereby oxidation of the iron with further production of hydrogen ensues and the gas cooled and heat stored in said iron, then discontinuing passage of the steam, conducting a reducing gas through the two bodies of oxidized iron until substantial reduction of iron oxide is effected, alternately and periodically reversing the flow of steam and reducing gas through said iron, withdrawing reducing gas, removing water and carbon dioxide therefrom, and utilizing the gas so treated again to effect reduction.

MATHIAS FRANKL.